US010789022B2

(12) United States Patent
Ito et al.

(10) Patent No.: US 10,789,022 B2
(45) Date of Patent: Sep. 29, 2020

(54) IMAGE PROCESSING APPARATUS IN WHICH A PROCESS REPEATEDLY ARRANGES A TARGET IMAGE ON A SHEET

(71) Applicant: CANON KABUSHIKI KAISHA, Tokyo (JP)

(72) Inventors: Naoki Ito, Tokyo (JP); Takashi Miyauchi, Inagi (JP); Yutaro Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/396,483

(22) Filed: Apr. 26, 2019

(65) Prior Publication Data

US 2019/0354320 A1 Nov. 21, 2019

(30) Foreign Application Priority Data

May 17, 2018 (JP) .................. 2018-095656

(51) Int. Cl.
*G06F 3/12* (2006.01)
*H04N 1/387* (2006.01)
*H04N 1/393* (2006.01)

(52) U.S. Cl.
CPC .......... *G06F 3/1205* (2013.01); *G06F 3/1242* (2013.01); *G06F 3/1256* (2013.01);
(Continued)

(58) Field of Classification Search
CPC .... G06F 3/1205; G06F 3/1242; G06F 3/1256; G06F 3/1286; H04N 1/3878;
(Continued)

(56) References Cited

U.S. PATENT DOCUMENTS

2004/0150856 A1* 8/2004 Asai ...................... G03G 15/36
 358/1.18
2014/0362402 A1* 12/2014 Tsuboi ............... H04N 1/00411
 358/1.15
(Continued)

FOREIGN PATENT DOCUMENTS

JP 07-261599 A 10/1995
JP 2004248262 A 9/2004

*Primary Examiner* — Iriana Cruz
(74) *Attorney, Agent, or Firm* — Canon U.S.A., Inc. I.P. Division

(57) ABSTRACT

An image processing apparatus perform operations. An inclination-corrected document image is acquired by executing detection of a document area from a scanned image, extraction of a document image corresponding to the detected document area from the scanned image and correction of an extracted document image inclination. An output size is designated to be used when an image of a repeat target area is printed out. The output size is designated based on a user instruction. A repeat target area is set based on the acquired inclination-corrected document image and the designated output size. An image inside the set repeat target area is scaled up/down such that the image has the output size, and the image is repeatedly laid out within a designated sheet size to create an output image subsequent to repeat layout processing. Print processing is executed by using the output image subsequent to the repeat layout processing.

7 Claims, 12 Drawing Sheets

(52) U.S. Cl.
CPC ......... *G06F 3/1286* (2013.01); *H04N 1/3878* (2013.01); *H04N 1/393* (2013.01)

(58) Field of Classification Search
CPC ........... H04N 1/393; H04N 2201/0094; G06K 15/1889; G03G 15/36
See application file for complete search history.

(56) References Cited

U.S. PATENT DOCUMENTS

2015/0278595 A1* 10/2015 Momoki ................. G06F 16/51
                                                            382/218
2018/0077309 A1* 3/2018 Saitoh .................. H04N 1/3878

* cited by examiner

IMAGE PROCESSING APPARATUS IN WHICH A PROCESS REPEATEDLY ARRANGES A TARGET IMAGE ON A SHEET

BACKGROUND OF THE INVENTION

Field of the Invention

The present disclosure relates to image repeat processing in which one portion of a document image inside a scanned image is set as a repeat target image, and the repeat target image is repeatedly arranged in one recording sheet.

Description of the Related Art

Some image forming apparatuses such as copiers and multi-function devices have functions of image repeat printing. The image repeat printing is a function in which one area of an image (a document image) of one original document read by a scanner is designated as a repeat target image, and the repeat target image is repeatedly arranged and then printed on one recording sheet. Japanese Patent Application Laid-Open No. 2004-248262 discusses a selection that can be made by a user whether a blank space is to be added between adjacent repeat target images when the repeat target image is repeatedly arranged. Japanese Patent Application Laid-Open No. 2004-248262 also discusses a setting that can be made by the user with respect to the number of repeats in a portrait direction and the number of repeats in a landscape direction.

Japanese Patent Application Laid-Open No. 07-261599 discusses arrangement of a repeat image. When a user sets the number of repeats, a scaling factor of the repeat image is automatically changed such that the repeat images for the set number of repeats are fitted within a sheet size designated beforehand, and then the repeat image is repeatedly arranged within the sheet size.

On the other hand, there is a user demand for a printed product in which a repeat target image is repeatedly printed in a state in which the repeat target image is scaled up or down so as to have an output size needed by a user, instead of a printed product in which a repeat target image is repeatedly printed in an actual size. However, in the technique discussed in Japanese Patent Application Laid-Open No. 07-261599, since a scaling factor of the repeat target image is automatically changed based on the number of repeats designated by the user, a print output size that is needed by the user cannot be accurately designated.

Moreover, in some cases, a copier can have a function by which a user directly designates any numeric value, for example, between 25% and 400%, as a scaling factor at the time of copying. However, the user has difficulty in knowing which value of the scaling factor to use to acquire a print product having a desired print output size. Particularly, if a scanned image is displayed on a screen for a user to manually designate one area inside the scanned image displayed on the screen as a repeat target image area, a change of a scan target document can cause a repeat target image area to take a different size each time image repeat printing is performed. The repeat target images having such different sizes may be intended to be printed in a certain output size needed by the user. In such a case, if a numeric value of a scaling factor is to be designated, the user needs to calculate an appropriate numeric value of a scaling factor and designate the calculated appropriate numeric value of scaling factor each time. However, the user has difficulty in knowing which value of the scaling factor to use to print a repeat target image in an output size needed by the user. Consequently, such a usage is not convenient for the user.

SUMMARY OF THE INVENTION

According to an aspect of the present disclosure, an image processing apparatus a memory to store a program, and at least one processor to execute the program to perform operations including acquiring an inclination-corrected document image by executing detection of a document area from a scanned image, extraction of a document image corresponding to the detected document area from the scanned image and correction of an inclination of the extracted document image, designating an output size to be used when an image of a repeat target area is printed out, wherein the output size is designated based on an instruction from a user, setting a repeat target area based on the acquired inclination-corrected document image and the designated output size, scaling up/down an image inside the set repeat target area such that the image has the output size, and repeatedly laying out the image within a designated sheet size to create an output image subsequent to repeat layout processing, and executing print processing by using the output image subsequent to the repeat layout processing.

Further features of the present disclosure will become apparent from the following description of embodiments with reference to the attached drawings.

DESCRIPTION OF THE EMBODIMENTS

Embodiments are hereinafter described in detail with reference to the drawings. However, components described in the embodiment are illustrative only, and each of the embodiments is not limited to the following disclosure.

<System Configuration>

Figure 1:
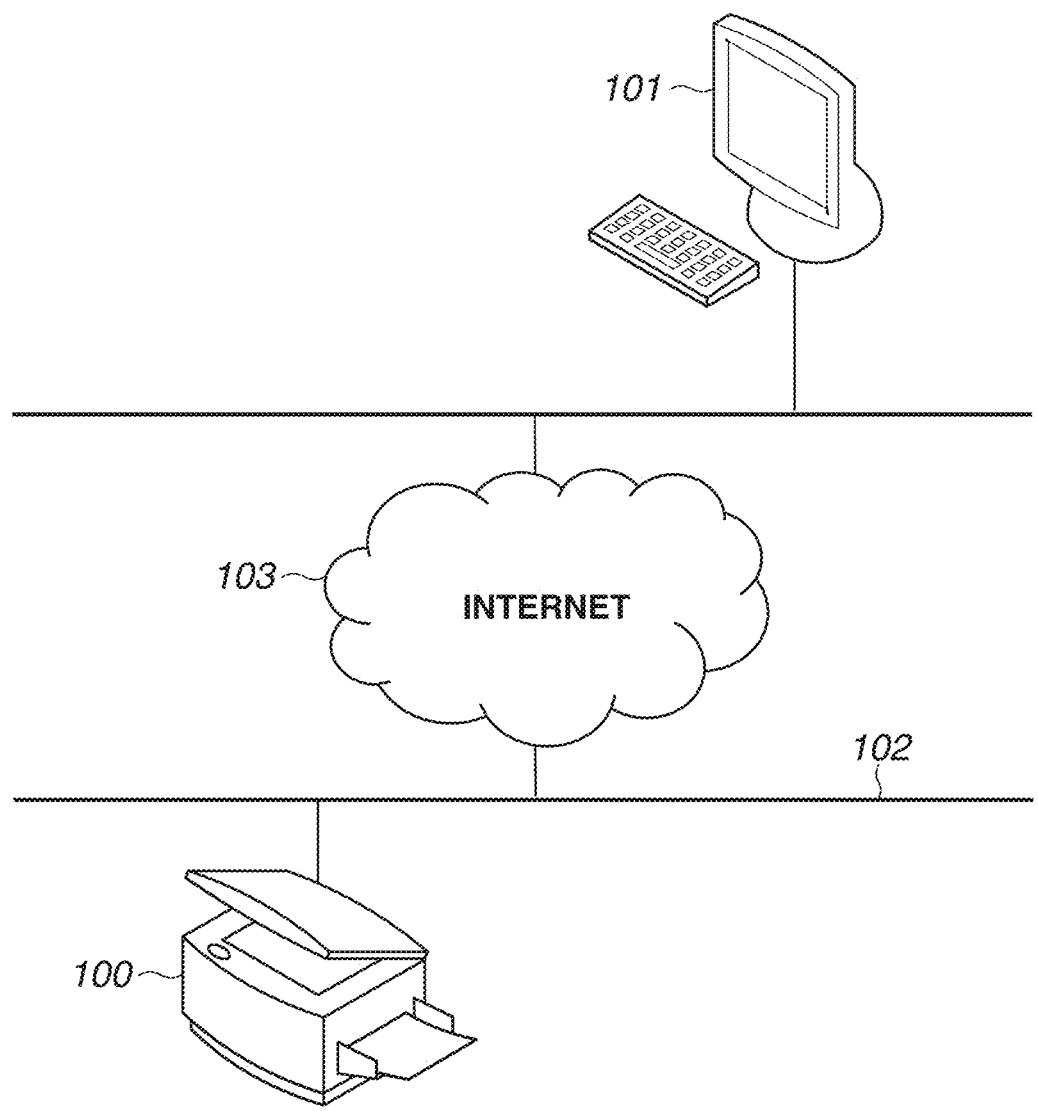
FIG. 1 illustrates an example of an overall configuration of a system.

A first embodiment is described. FIG. 1 is a diagram illustrating an overall configuration of a system to which the present embodiment can be applied. As illustrated in FIG. 1, an image forming apparatus (an image processing apparatus) 100 is connected to a local area network (LAN) 102, and can communicate with a terminal 101 such as a personal computer (PC) via Internet 103. The terminal 101 such as the PC may not be necessary for the present embodiment. The present embodiment can be realized by a configuration of only the image forming apparatus 100.

The image forming apparatus (the image processing apparatus) 100 is a multifunctional peripheral (MFP) including a display/operation unit 121, a scanner unit 120, and a printer unit 123. The image forming apparatus 100 can be used as a scan terminal that scans a document (e.g., a written document, a business card, a certificate photograph, a license, and a postcard) by using the scanner unit 120. The display/operation unit 121 such as a touch panel and a hard button displays a scanned image and a preview image of a layout processing result. Moreover, the display/operation unit 121 displays a user interface so that a user inputs an instruction. In the present embodiment, repeat layout processing (also referred to as image repeat processing) in which an image inside an area automatically extracted or manually designated from a scanned image is repeatedly laid out as a processing target in one output document is executed, and a preview image of a layout processing result is displayed on a screen. If a user presses a printing start button on the preview screen, the image forming apparatus 100 executes print processing by using the printer unit 123.

The present embodiment is described using an example in which the image forming apparatus 100 of a single unit performs scan processing, repeat layout processing, and print processing. However, a system in which one of such processing is performed by the other terminal 101 may be employed. For example, the scan processing and the repeat layout processing may be executed by the image forming apparatus 100, and an image of a layout processing result may be transmitted to the other terminal 101 via a network. In such a case, the image is printed from the other terminal 101.

<Hardware Configuration of Image Forming Apparatus 100>

Figure 2:
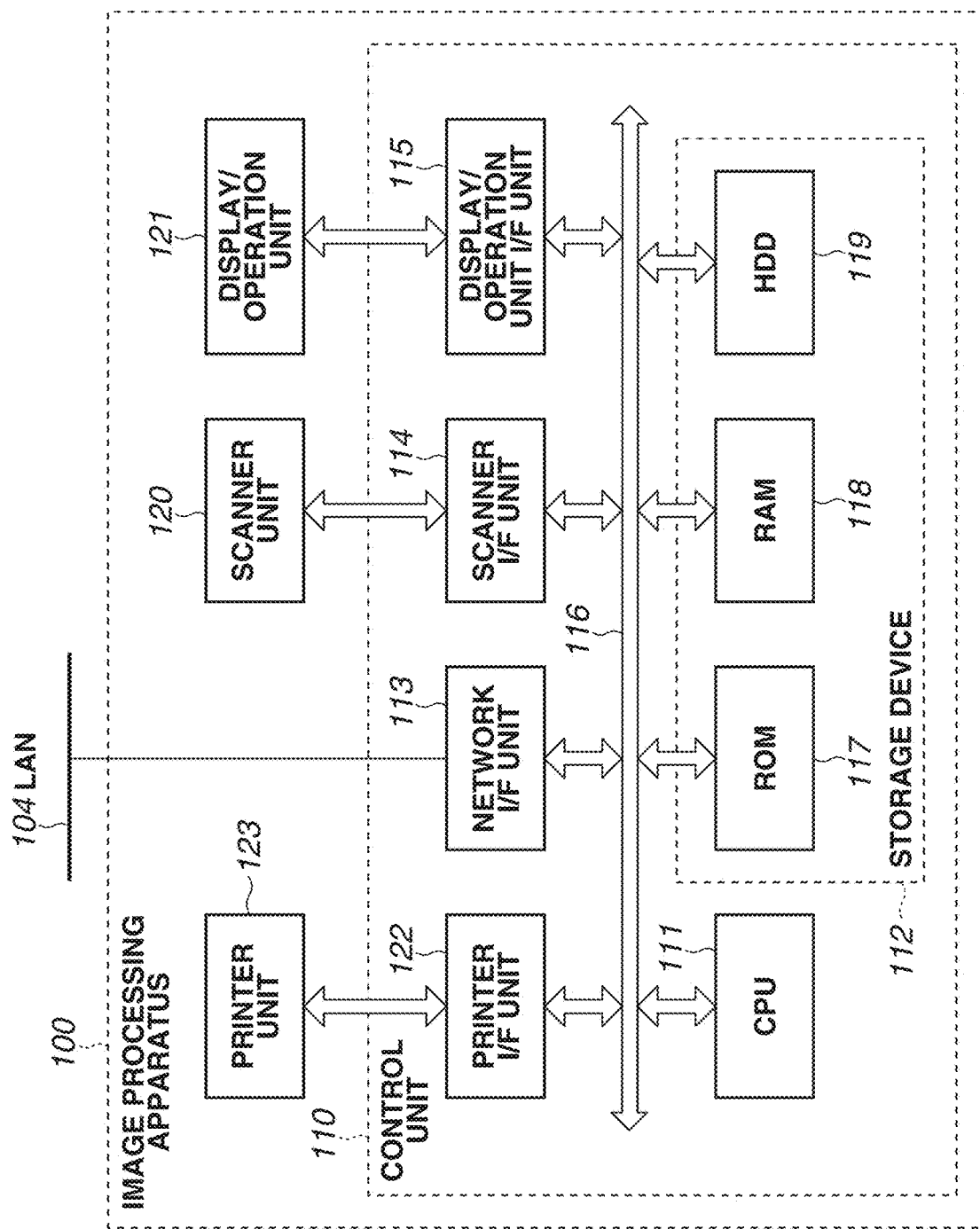
FIG. 2 is a diagram illustrating an example of a hardware configuration of an image forming apparatus.

FIG. 2 is a block diagram illustrating a configuration of the image forming apparatus 100. The image forming apparatus 100 includes a control unit 110 in which a central processing unit (CPU) 111, a storage device 112 (e.g., a read only memory (ROM) 117, a random access memory (RAM) 118, and a hard disk drive (HDD) 119), a network interface (I/F) unit 113, a scanner I/F unit 114, a display/operation unit I/F unit 115, and a printer I/F unit 122 are communicably connected to one another via a system bus 116. The control unit 110 comprehensively controls operations of the image forming apparatus 100.

The CPU 111 functions as a unit that reads a control program stored in the storage device 112 and executes the control program, thereby executing each processing (e.g., reading control, display control, and printing control) in a flowchart described below. The storage device 112 stores and retains a program and data such as the control program, image data, metadata, setting data, and processing result data. The storage device 112 includes the ROM 117 that is a non-volatile memory, the RAM 118 that is a volatile memory, and the HDD 119 that is a large-capacity storage area. The ROM 117 as the non-volatile memory retains, for example, a control program. The CPU 111 reads the control program to perform control. The RAM 118, which is the volatile memory, is used as a main memory and a temporary storage area such as a work area of the CPU 111.

The network I/F unit 113 connects the control unit 110 (the image forming apparatus 100) to a LAN 104 via the system bus 116. The network I/F unit 113 transmits image data to an external device on the LAN 104, and receives various information from the external device on the LAN 104.

The scanner I/F unit 114 connects the scanner unit 120 to the control unit 110 via the system bus 116. The scanner unit 120 reads an image on a document to generate scanned image data, and inputs the scanned image data to the control unit 110 via the scanner I/F unit 114.

The display/operation unit I/F unit 115 connects a display/operation unit 121 to the control unit 110 via the system bus 116. The display/operation unit 121 includes a keyboard and a liquid display unit having a touch panel function.

A printer I/F unit 122 connects a printer unit 123 to the control unit 110 via the system bus 116. The printer unit 123 receives image data subsequent to layout processing via the printer I/F unit 122. The image data to be received by the printer unit 123 is generated by the CPU 111. The printer unit 123 performs print processing on a recording sheet by using the received image data.

Accordingly, the image forming apparatus 100 of the present embodiment with the above hardware configuration can provide an image processing function.

<Image Repeat Processing Function>

A description is given of image repeat processing (repeat layout processing) as the image processing function according to the present embodiment.

The image forming apparatus 100 scans a document placed on a platen glass of the scanner unit 120 to acquire a scanned image. The image forming apparatus 100 executes image analysis processing on the scanned image which has been acquired, and performs detection of a document area, extraction of the document area, and correction of inclination of the document area to acquire an inclination-corrected document image. The document area detection processing will be described below. Moreover, the image forming apparatus 100 causes the user to designate an output size to be applied if a repeat target image is printed out. Then, the image forming apparatus 100, based on the inclination-corrected document image and the output size designated by the user, identifies a repeat target area inside the document image. The image forming apparatus 100 calculates a scaling factor of the repeat target image based on a size of the identified repeat target area and the output size designated by the user, and preforms scaling processing based on the calculated scaling factor such that the repeat target image is printed in the designated output size. Then, the image forming apparatus 100 determines a layout in an output image corresponding to a designated sheet size. The layout to be determined is used if the image of the repeat target area having undergone the scaling processing is repeatedly arranged. The image forming apparatus 100 arranges the repeat target image having undergone the scaling processing based on the determined layout to generate an image repeat processing result image, and displays a preview image on a user interface (UI) of the display/operation unit 121. Herein, if the identified repeat target area is deviated from a position desired by the user, the user can modify a position and a size of the repeat target area based on an instruction from the user. If the repeat target area is modified, the image forming apparatus 100 extracts a repeat target image based on a position of the modified repeat target area, calculates a scaling factor of the modified repeat target image based on a size of the modified repeat target area and the output size designated by the user for print output, and redoes a layout. Moreover, the image forming apparatus 100 can receive an instruction to print the image repeat processing result image from the user via the display/operation unit.

Figure 3:
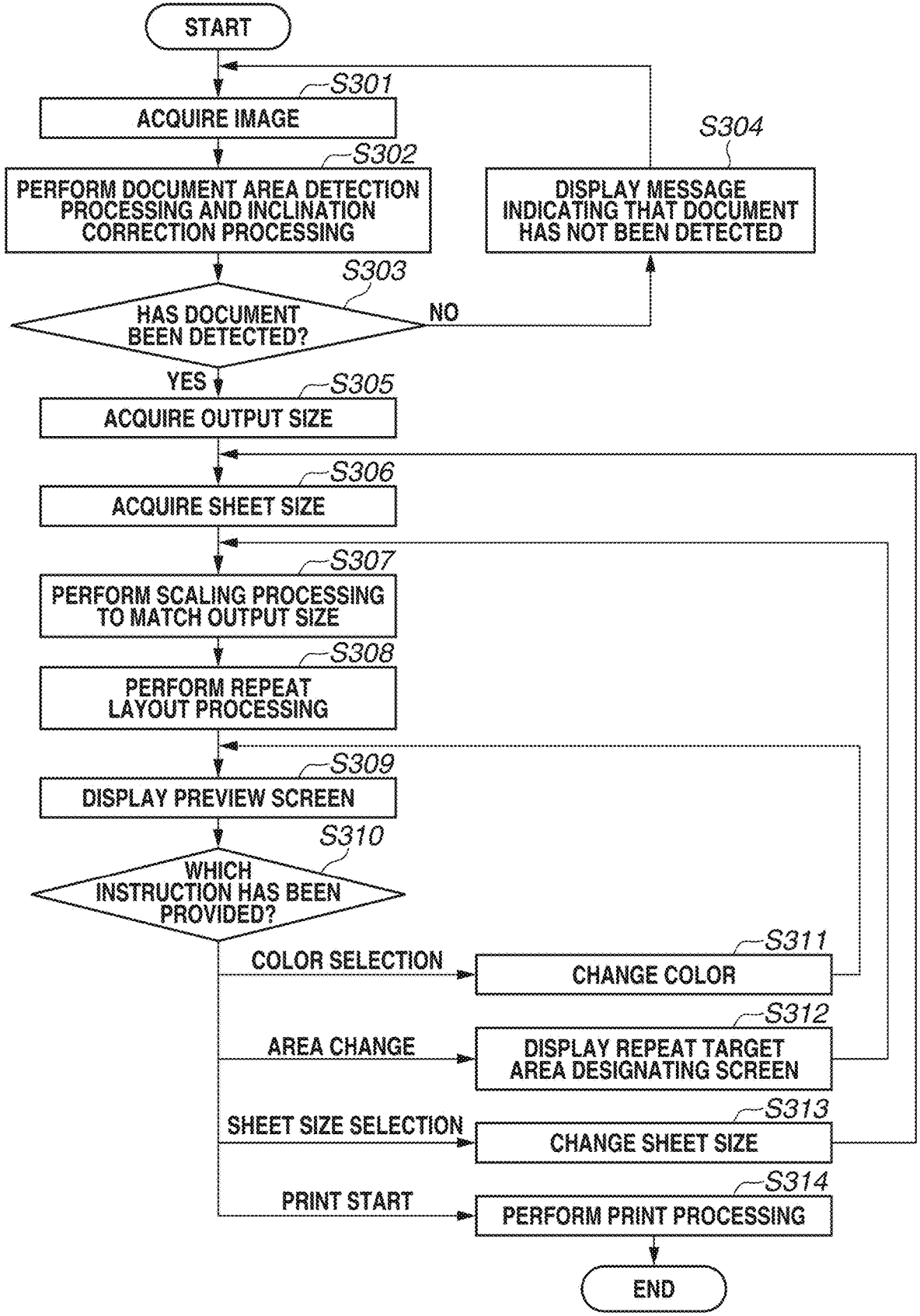
FIG. 3 is a flowchart illustrating image repeat processing according to a first embodiment.
Figure 4:
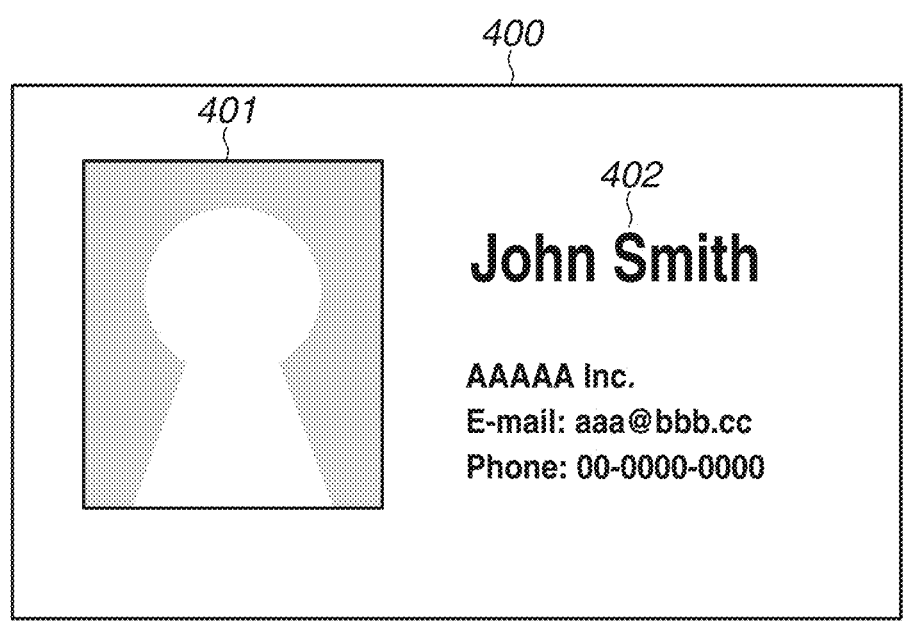
FIG. 4 is a diagram illustrating an example of a scan target document.

FIG. 3 is a flowchart illustrating the image repeat processing according to the first embodiment in detail. The CPU 111 of the image forming apparatus 100 loads a processing program stored in the ROM 117 to the RAM 118, and executes the loaded processing program to function as a processing unit that executes each processing in the flowchart illustrated in FIG. 3. The present embodiment is described using an example case in which a business card as illustrated in FIG. 4 is scanned as a scan target document. However, a type of the document is not limited to the business card. A written document in a standard size or non-standard size, a license, a certificate photograph, various cards, and a postcard can be used.

Figure 6:
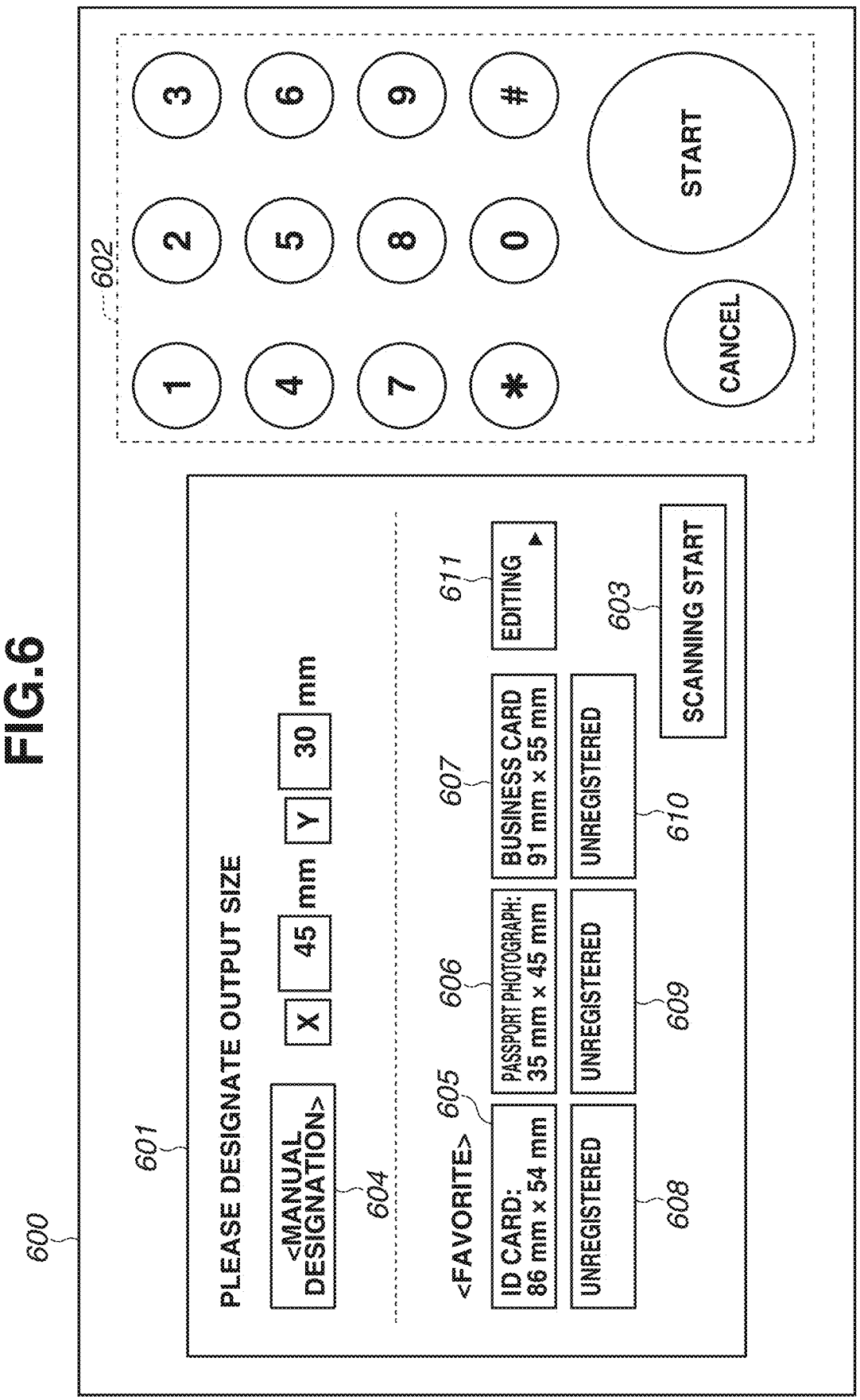
FIG. 6 is a diagram illustrating an example of a screen for designation of a print output size of a repeat target image.

If a user designates an image repeat processing mode on an operation screen of the image forming apparatus 100, a touch panel display area 601 illustrated in FIG. 6 is displayed on the operation screen. In FIG. 6, the display/operation unit 121 includes the touch panel display area 601 and a hard key 602 (including numeric keys and a start key for various processing). In the touch panel display area 601, a message and a scanning start button (a software key) 603 are displayed. The message prompts a user to set a document on the platen glass and start scan processing, and the scanning start button 603 is used by the user to issue a scanning start instruction. Moreover, in the touch panel display area 601, buttons 604 through 610 for causing the user to designate an output size, and a button 611 for causing the user to optionally edit the output size are displayed. The manual designation button 604 illustrated in FIG. 6 allows the user to designate an optional value for an output size (a size of width (X) and a size of height (Y)) that is applied when a repeat target image is printed. The example illustrated in FIG. 6 indicates state in which the manual designation button 604 is pressed, and a width of 45 mm and a height of 30 mm are designated as an output size. Each of the buttons 605 through 610 illustrated in FIG. 6 is a button in which a size that is commonly used as an output size can be registered. The user can press any of the buttons 605 through 610 to readily designate a corresponding output size. For example, the "ID card 86 mm×54 mm" button 605 is used to designate an output size having a width of 86 mm and a height of 54 mm (a size commonly used for identification (ID) card) as an output size to be applied when a repeat target image is printed. The "passport photograph 35 mm×45 mm" button 606 is used to designate an output size having a width of 35 mm and a height of 45 mm (a size commonly used for passport photograph). The "business card 91 mm×55 mm" button 607 is used to designate an output size having a width of 91 mm and a height of 55 mm (a size commonly used for business card). Each of the buttons 608 through 610 is in an unregistered state in which an output size is not currently registered. If the editing button 611 is pressed, a software keyboard is displayed. Accordingly, as for any of the buttons 605 through 610 instructed for editing by the user, an output size and a name to be set to the button can be edited/input. A limit may be set to a range of values of a length of characters that can be set to a button name or an output size (a size of width and height to be used when a repeat target image is printed). In such a case, if a value that is out of the range is designated, the value is considered as an error. Moreover, the use of the editing button 611 can change a registered button name and a size to be applied when a cutout image is printed.

If the user designates the image repeat processing mode and the screen illustrated in FIG. 6 is displayed, any one of the buttons 604 through 610 for designation of an output size is in a selection state. In the present embodiment, the manual designation button 604 is an initial selection state, and a last-set output size (or a default size) is being designated. However, the present embodiment is not limited thereto. For example, if any of the buttons 605 through 610 may have been selected at the time of last output size designation, the screen can be displayed such that the button is in a selection state.

Figure 5:
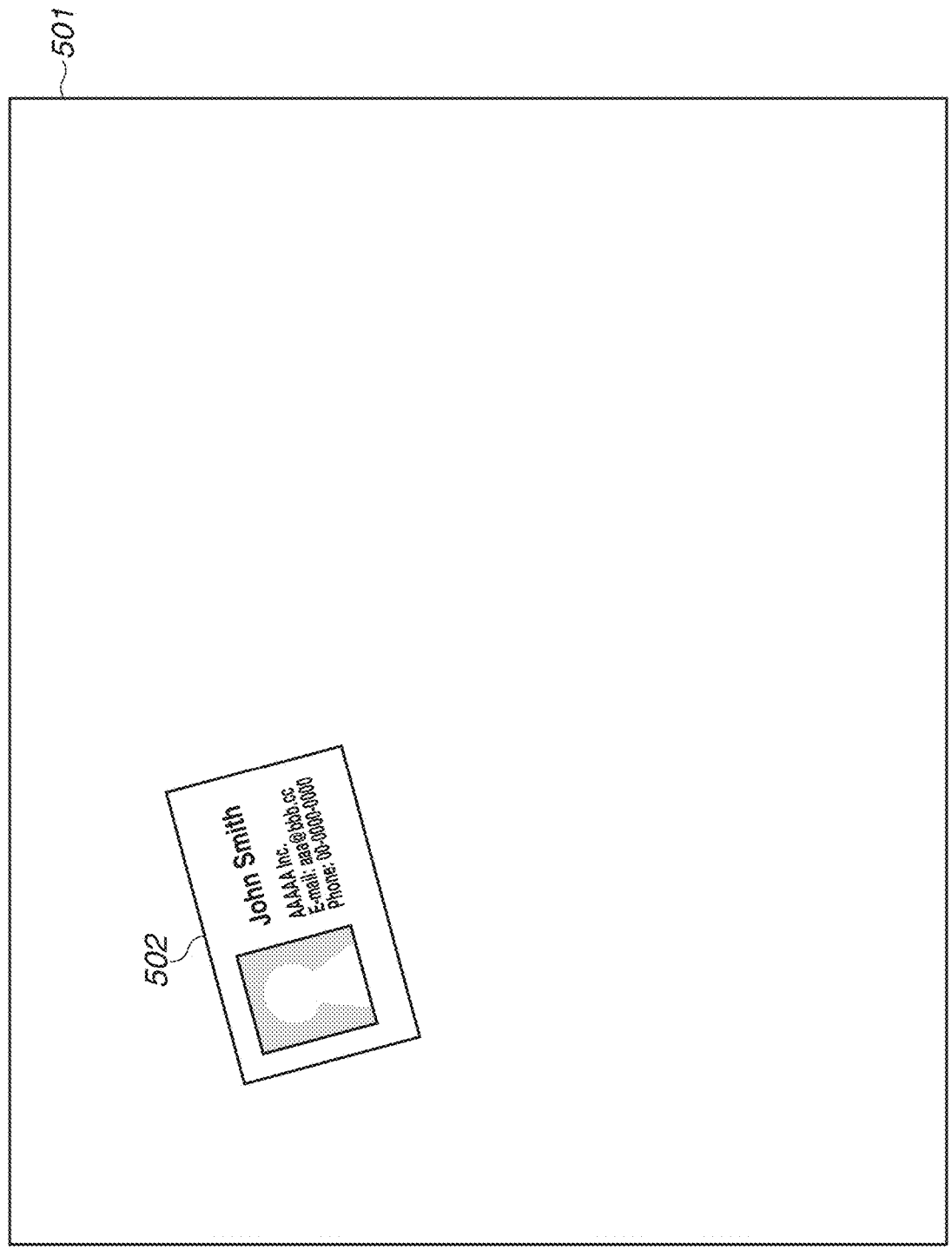
FIG. 5 illustrates an example of an image that is acquired as a result of reading of a document placed on a platen glass and has a size that is the same as a platen glass size

If the user selects the scanning start button 603, the processing proceeds to step S301. In step S301, the CPU 111 of the image forming apparatus 100 operates the scanner unit 120 to acquire an image. If a business card as illustrated in FIG. 4 or a document having a non-standard size is placed on the platen glass and then scanned, a document size may not be automatically detected by a document size detection sensor. Thus, in the image repeat processing of the present embodiment, the platen glass as a whole is considered as a reading target, so that a scanned image having the same size as the platen glass is acquired. A business card (document) 400 illustrated in FIG. 4 is an example, and includes an area 401 including a photograph and an area 402 in which a character string such as a name and an address is stated. If such a business card 400 is placed on the platen glass and then scanned, a scanned image 501 as illustrated in FIG. 5 is acquired as a result of the scanning Herein, if the business card 400 is randomly placed on the platen glass and then scanned with the business card inclined relative to the platen glass, the scanned image 501 includes an inclined business card image 502.

In step S302, the CPU 111 executes image analysis processing (document area detection processing) on the image acquired in step S301 to detect a document area. Moreover, the CPU 111 cuts out a portion image of the detected document area, and performs inclination correction processing. Thus, an area of the business card image 502 in the scanned image 501 acquired in step S301 can be cut out, and an inclination-corrected image can be acquired. Each of the document area detection processing and the inclination correction processing can be performed by using a known method. The method for detecting a scanned image from a document area can include a known method. With the known method, for example, an edge strength image is determined by application of the Sobel filter to a scanned image, and a portion in which pixels having high edge strength are linearly connected is detected as a side of a document. Then, four apices are identified based on the detected four sides of the document, and an image of the document area is cut out based on the identified four apices (that is, a document image is extracted from a scanned image). Herein, the image of the document area cut out from the scanned image may be inclined. In such a case, inclination correction is further performed to acquire the image as an inclination-corrected document image. In the inclination correction, for example, an inclination angle is estimated based on coordinates of the identified four apices, and the image can be rotated in a direction in which the inclination angle is corrected. The processing for cutting out an image of a document area (document image extraction processing) and the inclination correction processing can be executed in order. Alternatively, the cutout of an image and the inclination correction can be executed at the same time. For example, predetermined projection conversion processing can be performed on pixels inside a rectangular area surrounded by the four apices, so that extraction of pixels inside the rectangular area and inclination correction can be performed at the same time.

In step S303, the CPU 111 determines whether the document has been detected based on a result of the document area detection processing performed in step S302. If the CPU 111 determines that the document has not been detected (NO in step S303), the processing proceeds to step S304. In step S304, the CPU 111 causes the display/operation unit 121 to display an indication that the document has not been detected and a message prompting the user to place the document on the platen glass again to re-execute the processing. If the CPU 111 determines that the document has been detected (YES in step S303), the processing proceeds to step S305.

In step S305, the CPU 111 acquires information about an output size designated on the screen illustrated in FIG. 6. If any of the unregistered buttons 608 through 610 may be selected for an output size, an image size of the document area, which is detected and the inclination of which is corrected in step S302, can be used as an output size. The operation to be performed if the unregistered button is selected for an output size is not limited to thereto. For example, an indication that an output size is not registered may be displayed on a screen to cause the user to designate an output size.

In step S306, the CPU 111 acquires information about a sheet size of a designated output sheet. In a case where a sheet size has not been designated by the user, the CPU 111 acquires information about a sheet size (e.g., an A4 size) that is set a default. The use of a sheet on a manual feed tray may be designated beforehand. In such a case, the CPU 111 can cause the user to designate a sheet size at this point in time.

In step S307, the CPU 111 identifies an initial repeat target area based on the inclination-corrected document image acquired in step S302 and the output size information acquired in step S305. Moreover, the CPU 111 calculates a scaling factor such that an image inside the repeat target area has the output size designated in step S305 when the image is printed, and performs scaling processing on the image inside the repeat target area (the repeat target image). In the inclination-corrected document image, the initial repeat target area is provided by setting an area that has a largest dimension with an aspect ratio substantially the same as an aspect ratio of the output size acquired in step S305 in a center position of the inclination-corrected document image. The scaling factor is calculated based on information about resolution and the number of pixels in width and height of the image of the repeat target area, information about resolution of the image to be printed, and the size designated in step S305. As for the scaling processing method, a technique such as known bicubic is used to perform the scaling processing. Moreover, if a position or a size of the repeat target area is changed in step S312 described below, scaling processing is performed using an image inside the changed repeat target area.

In step S308, the CPU 111 executes repeat layout processing based on the output size (a repeat target image size) acquired in step S305 and the sheet size information acquired in step S306. The repeat layout processing determines a position in which the repeat target image is repeatedly laid out inside an output sheet. In the repeat layout processing, the CPU 111 calculates the number of images that can be arranged if the repeat target image is arranged from the upper left of the output sheet, based on a width and a height of the output sheet and a size of the repeat target image. Then, the CPU 111 calculates the number of images that can be arranged if the repeat target image is rotated by 90 degrees and then arranged from the upper left of the output sheet. The CPU 111 compares the number of images arranged without 90-degree rotation, with the number of images arranged with 90-degree rotation, and uses a layout having the greater number of arrangeable images to repeatedly arrange the repeat target image to create an image subsequent to the repeat processing (i.e., an output image to be used in print processing is created). If the number of arrangeable images without 90-degree rotation is the same as the number arrangeable images with 90-degree rotation, an output image is created using a layout in which the repeat target image is not rotated.

Figure 7:
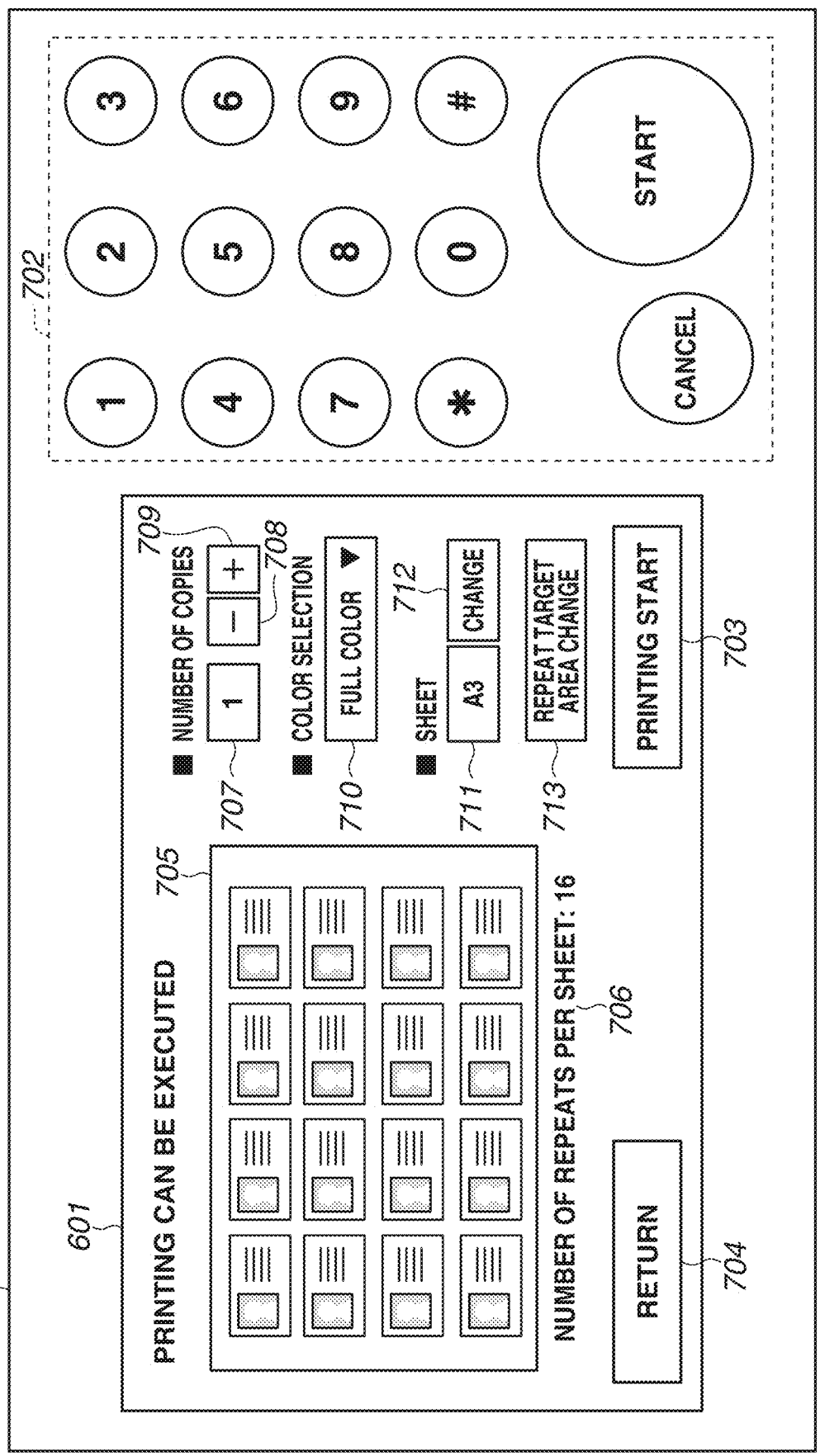
FIG. 7 is a diagram illustrating an example of a preview screen on which an image acquired by execution of image repeat layout processing is previewed.

In step S309, the CPU 111 creates a preview image of the output image created in step S308, and displays the preview image on a preview screen on the display/operation unit 121. The preview screen to be displayed on the display/operation unit 121 is described with reference to FIG. 7. In FIG. 7, a display content displayed in the touch panel display area 601 illustrated in FIG. 6 is changed to an output image preview screen.

In FIG. 7, a preview image 705 of the output image created in step S308 is displayed. Moreover, sheet quantity information 706 is displayed. The sheet quantity information 706 indicates the number of repeat target images that have been laid out in the output image created in step S308. The example illustrated in FIG. 7 indicates that 16 repeats target images are repeatedly arranged inside one output image.

A print quantity 707 represents a number indicating the number of sheets on which an output image is printed. If the user presses a plus button 709, a number in the print quantity 707 increases. If the user presses a minus button 708, a number in the print quantity 707 decreases. A number in the print quantity 707 can increase or decrease each time the plus button 709 or the minus button 708 is clicked. Alternatively, a number in the print quantity 707 can continuously change while the plus button 709 or the minus button 708 is being pressed down. Moreover, a hard key 702 can be used to input a number in the print quantity 707.

A pull-down menu 710 is provided so that the user can select whether the output image is to be printed in color or monochrome. In a default setting, "full color" is automatically selected if a repeat target image is a color image, whereas "monochrome" is automatically selected if a repeat target image is a monochrome image. The use of the pull-down menu 710 for the color selection allows the user to manually change a full-color print/monochrome print setting. As described below in step S311, if a full-color print/monochrome print setting is changed, the preview image 705 is changed based on the changed setting. For example, if the user changes the setting to monochrome in state in which full color is automatically selected, the preview image 705 is changed to a preview of a monochrome image in response to such a setting change.

In FIG. 7, a sheet size 711 represents a sheet size that is currently designated. If the user presses a sheet size change button 712, sheet size change processing is performed as described in step S312 below. If a sheet size is changed, the CPU 111 executes the repeat layout processing in step S308 to create an output image again based on the changed sheet size and the repeat target image size, and updates the preview image 705 of the output image and the sheet quantity information 706.

Figure 9:
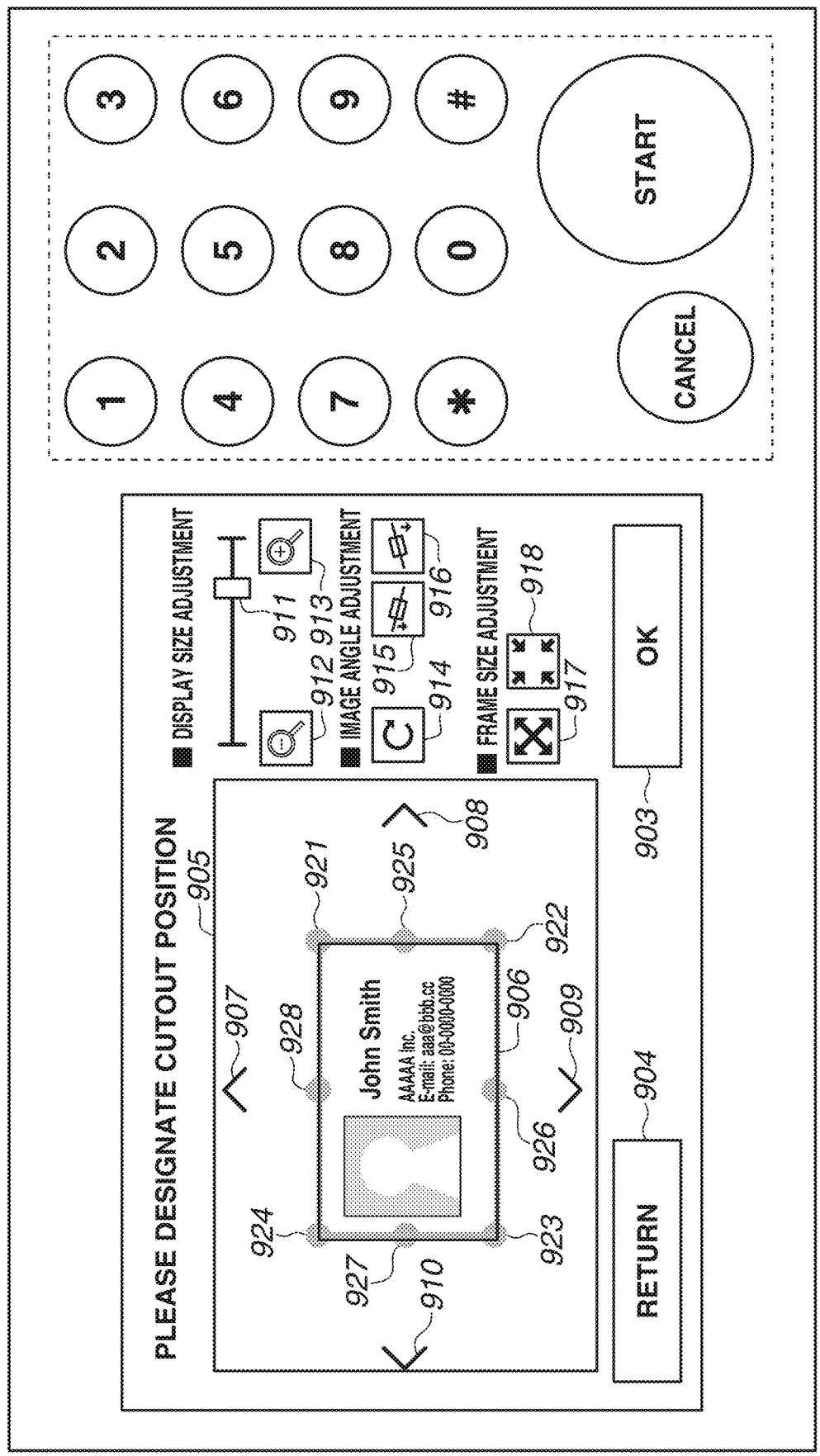
FIG. 9 is a diagram illustrating an example of a default display on a repeat target area designation screen.

If the user presses a repeat target area change button 713, a repeat target area designation screen as illustrated in FIG. 9 is displayed. Thus, the user can modify the repeat target area to a repeat target area having a desired size/a desired position. The repeat target area designation screen illustrated in FIG. 9 is described below in detail in step S312.

If the user presses a printing start button 703, print processing is started based on a current setting content as described below in step S314. Moreover, if the user presses a return button 704, the display returns to the screen illustrated in FIG. 6.

In step S310, the CPU 111 determines whether any of the buttons and the pull-down menu displayed on the preview screen illustrated in FIG. 7 has been instructed by the user. If the CPU 111 determines that the pull-down menu 710 for color selection has been instructed (COLOR SELECTION in step S310), the processing proceeds to step S311. If the CPU 111 determines that the repeat target area change button 713 has been instructed (AREA CHANGE in step S310), the processing proceeds to step S312. If the CPU 111 determines that the sheet size change button 712 has been instructed (SHEET SIZE SELECTION in step S310), the processing proceeds to step S313. If the CPU 111 determines that the printing start button 703 has been instructed (PRINT START in step S310), the processing proceeds to step S314.

If the CPU 111 determines that a content of the instruction from the user is a change of a full color/monochrome setting in the pull-down menu 710 for color selection (COLOR SELECTION in step S310), the processing proceeds to step S311. In step S311, the CPU 111 updates a display of the pull-down menu 710 based on the changed setting. Moreover, the processing returns to step S309 in which the CPU 111 also updates the preview image 705 based on the changed setting. For example, when full-color printing is set, the user may change the setting to monochrome printing by using the pull-down menu 710. In such a case, in step S309, the CPU 111 creates a monochrome preview image to update a display of the preview screen. A monochrome preview image and an output image are not necessarily created at the time of setting change to the monochrome printing by the pull-down menu 710. For example, a color preview image and a monochrome preview image can be created beforehand when a preview screen is created based on the output image created by the repeat layout processing in step S308.

If the CPU 111 determines that a content of the instruction from the user is a press of the repeat target area change button 713 (AREA CHANGE in step S310), the processing proceeds to step S312. In step S312, the CPU 111 displays a repeat target area designation screen (FIG. 9) for changing a repeat target area in the touch panel display area.

The repeat target area designation screen illustrated in FIG. 9 is described in detail. In a display area 905 illustrated in FIG. 9, a preview image of a cutout image as a result of the document area detection processing and the inclination correction processing performed in step S302 is displayed (a preview image of an inclination-corrected document-portion image is displayed). In the display area 905, a frame 906 indicating a position of the repeat target area at that time is also displayed with the frame 906 overlapping the cutout image. The frame 906 indicating a position of the repeat target area is desirably displayed in a distinguishable color line (e.g., a red line). Before the repeat target area is changed based on an instruction from the user, as illustrated in FIG. 9, the frame 906 is displayed as a repeat target area to be identified in step S307. Each of handlers 921, 922, 923, and 924 is displayed in an apex of the frame 906. The user can change positions of the apices by using the handlers, so that the repeat target area can be scaled up/down. The repeat target area is scaled up/down such that an aspect ratio remains the same as an aspect ratio of the output size acquired in step S305. Each of handlers 925, 926, 927, and 928 is used by the user to change a position of a side of the frame 906. The repeat target area can also be scaled up/down by operation of these handers. Herein, the repeat target area is scaled up/down such that an aspect ratio remains the same as an aspect ratio of the output size acquired in step S305. The frame of the repeat target area is scaled up/down with the aspect ratio held constant, so that the repeat target image can undergo the scaling processing in step S307 so as to match the output size designated in step S305. If the user presses any of arrows 907, 908, 909, and 910, the document-portion image being displayed is moved in a direction of the pressed arrow. That is, the use of the arrows 907, 908, 909, and 910 relatively moves the document-portion image without moving a position of the frame 906, so that a position of the document-portion image can be adjusted to a cutout position desired by the user. The movement of the document-portion image is not limited to the operation of the arrows 907, 908, 909, and 910. The user can perform a touch-and-drag operation to move the document-portion image in a position that is an outer side of the frame 906 and an inner side of the display area 905 of the preview image.

A bar 911 indicates a state of display magnification of an image displayed in the display area 905. If the bar 911 is arranged on the right size, an enlarged image is displayed. If the bar 911 is arranged on the left side, a reduced image is displayed. If the user presses a button 912, an image is displayed at a lower display magnification. If the user presses a button 913, the image is displayed at a higher display magnification. The user can directly move the bar 911 by drag operation to change a display magnification. Moreover, if the user presses a button 914, a display direction of the image displayed in the display area 905 is rotated by 90 degrees. If the user presses a button 915, the image displayed in the display area 905 is rotated counterclockwise in increments of 0.5 degrees. If the user presses a button 916, the image displayed in the display area 905 is rotated clockwise in increments of 0.5 degrees. In the present embodiment, each of the buttons 915 and 916 has been described using a rotation angle in 0.5-degree increments. However, a rotation angle is not limited to 0.5-degree increments. Moreover, a button 917 is used to issue an instruction that the frame 906 is to be enlarged with an aspect ratio of the frame 906 held constant. If the user presses the button 917, each side of the frame 906 is moved outward by a predetermined number of pixels. A button 918 is used to issue an instruction that the frame 906 is to be reduced with an aspect ratio of the frame 906 held constant. If the user presses the button 918, a position of each side of the frame 906 is moved by a predetermined number of pixels in a direction in which the frame 906 shrinks. If the user presses a button 904, the frame position changed in FIG. 9 is cancelled, and the display returns to the screen illustrated in FIG. 7.

Figure 10:
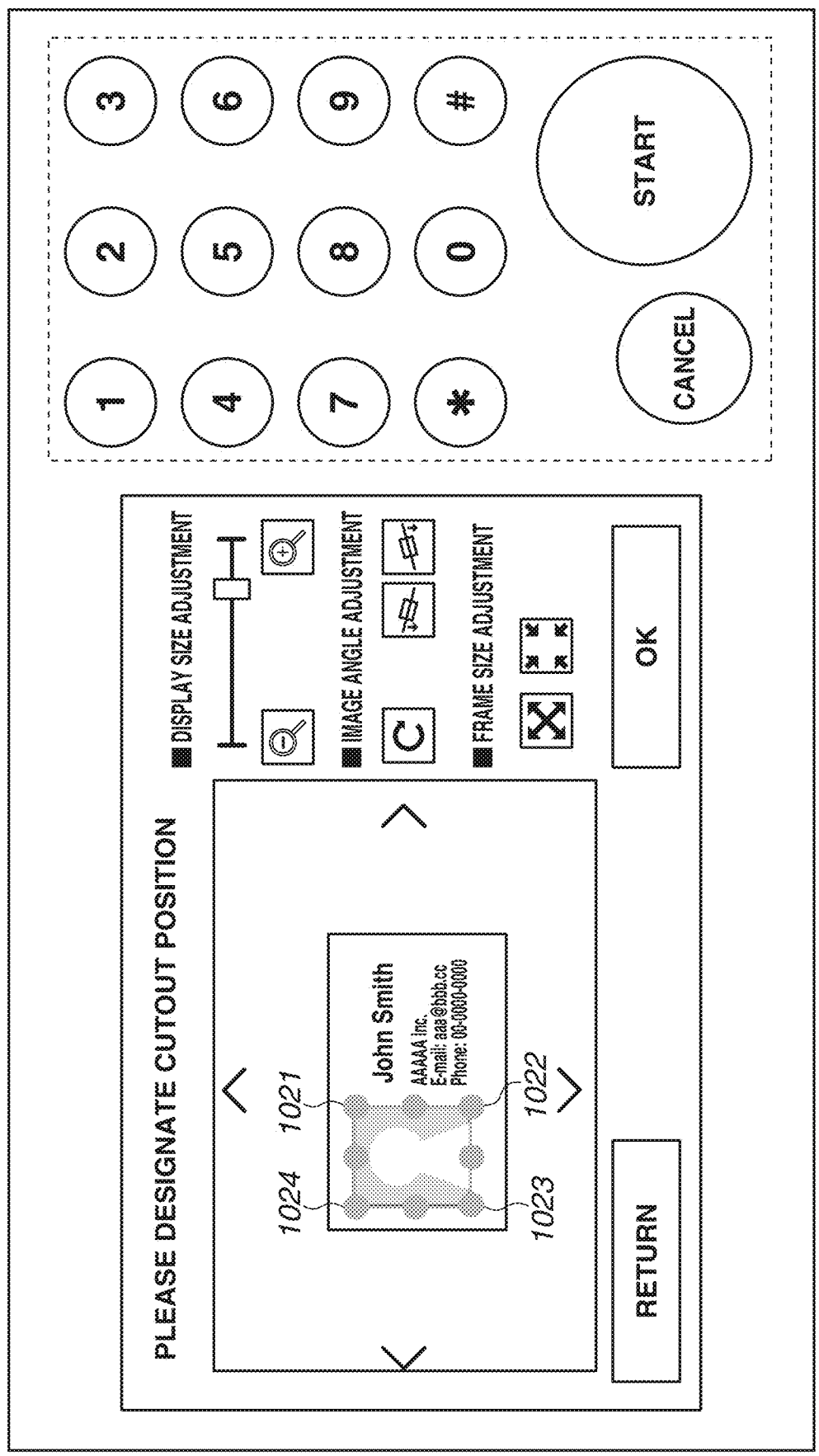
FIG. 10 is a diagram illustrating an example in which a position of a frame indicating a repeat target area is modified on the repeat target area designation screen.

Moreover, if the user presses a button 903, the CPU 111 determines the repeat target area based on a position of the frame 906 set at that time, and executes the repeat layout processing of step S306 based on an image of the repeat target area. For example, the user may intend to set only a photograph area included inside a business card image (a document image) as a repeat target area. In such a case, the user changes positions of the handlers 921 through 924 of the frame apices illustrated in FIG. 9 to positions of handlers 1021 through 1024 of frame apices illustrated in FIG. 10. In such a state, if the user presses an OK button, the CPU 111 determines an area enclosed by the frame illustrated in FIG.

Figure 11:
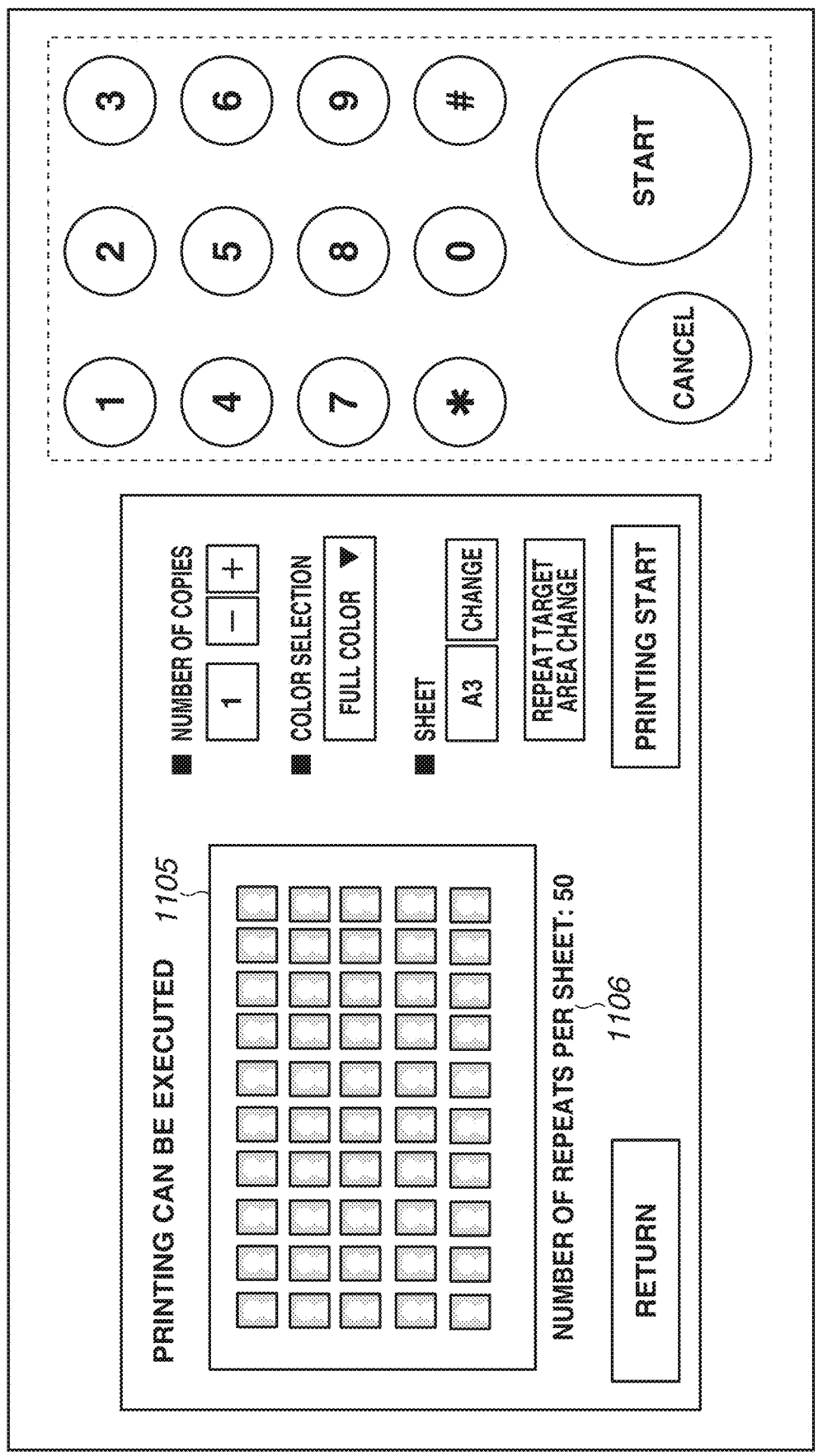
FIG. 11 is a diagram illustrating an example of a preview screen on which an image acquired by execution of image repeat layout processing subsequent to modification of the position of the frame indicating the repeat target area is previewed.

10 as a repeat target area, and re-executes the repeat layout processing of step S306 by using an image of the determined repeat target area. Subsequently, in step S307, the CPU 111 displays a preview image of the output image acquired by the repeat layout processing performed in step S306 on a preview screen 1105 as illustrated in FIG. 11. Sheet quantity information 1106 illustrated in FIG. 11 indicates the number of images that are laid out. The image herein represents an image of the repeat target area changed in FIG. 10.

If the CPU 111 determines that a content of the instruction from the user is a press of the sheet size change button 712 (SHEET SIZE SELECTION in step S310), the processing proceeds to step S313. In step S313, the CPU 111 presents a plurality of sheet size options (e.g., standard sizes A4, A3, B4, and B5), and determines a sheet size selected by the user from the plurality of sheet size options. The method for changing a sheet size is not limited to a selection of a sheet size from standard sizes. A non-standard sheet size (width and height size of a sheet) can be manually input by the user. If a sheet size is changed in step S313, the CPU 111 acquires the changed sheet size in step S306, executes repeat layout processing in step S308 based on the changed sheet size, and displays a preview screen in step S309.

If the CPU 111 determines that a content of the instruction from the user is a press of the printing start button 703 (PRINT START in step S310), the processing proceeds to step S314. In step S314, the CPU 111 performs control such that printing is executed by printer unit 123 by using the output image created in step S308.

According to the first embodiment, on the repeat target area designation screen illustrated in FIG. 9, the inclination-corrected document portion image acquired in step S302 is displayed, instead of the scanned image on the entire platen glass acquired in step S301. In a case where the scanned image of the entire platen glass is previewed as is, a business card image included inside the scanned image is displayed in a relatively small size. Consequently, a user cannot properly designate an area that is intended to be set as a repeat target. In the present embodiment, since the document portion image acquired in step S302 is displayed larger, a user can readily designate an area that is intended to be set as a repeat target. Moreover, since an inclination-corrected document portion image is displayed, the user can accurately and more readily designate an area to be set as a repeat target. Moreover, even if a document on a platen glass is scanned with the document inclined, the inclination of the document is corrected in step S302. Thus, the user does not need to be careful that a document is not inclined when the user places the document on the platen glass.

An initial repeat target area is identified based on the inclination-corrected document image acquired in step S302 and the output size acquired in step S305, and scaling processing is performed on the repeat target image. Then, repeat layout processing in step S308 is executed to create an output image, and a preview image of the output image is initially displayed on the preview screen which is displayed in step S309 and illustrated in FIG. 7. Therefore, if the user intends to accept the setting as is, the user presses a printing start button, and repeat layout processing can be easily executed.

A second embodiment is hereinafter described. The first embodiment has been described using an example in which if the user presses a scanning start button on the operation screen illustrated in FIG. 6, the processing in steps S301 through S309 illustrated in FIG. 3 is executed, and the preview screen illustrated in FIG. 7 is displayed. The second embodiment is described using an example in which if a user presses a scanning start button on an operation screen illustrated in FIG. 6, a repeat target area designation screen illustrated in FIG. 9 is displayed for the user to check and modify a repeat target area before a preview screen illustrated in FIG. 7 is displayed.

Figure 8:
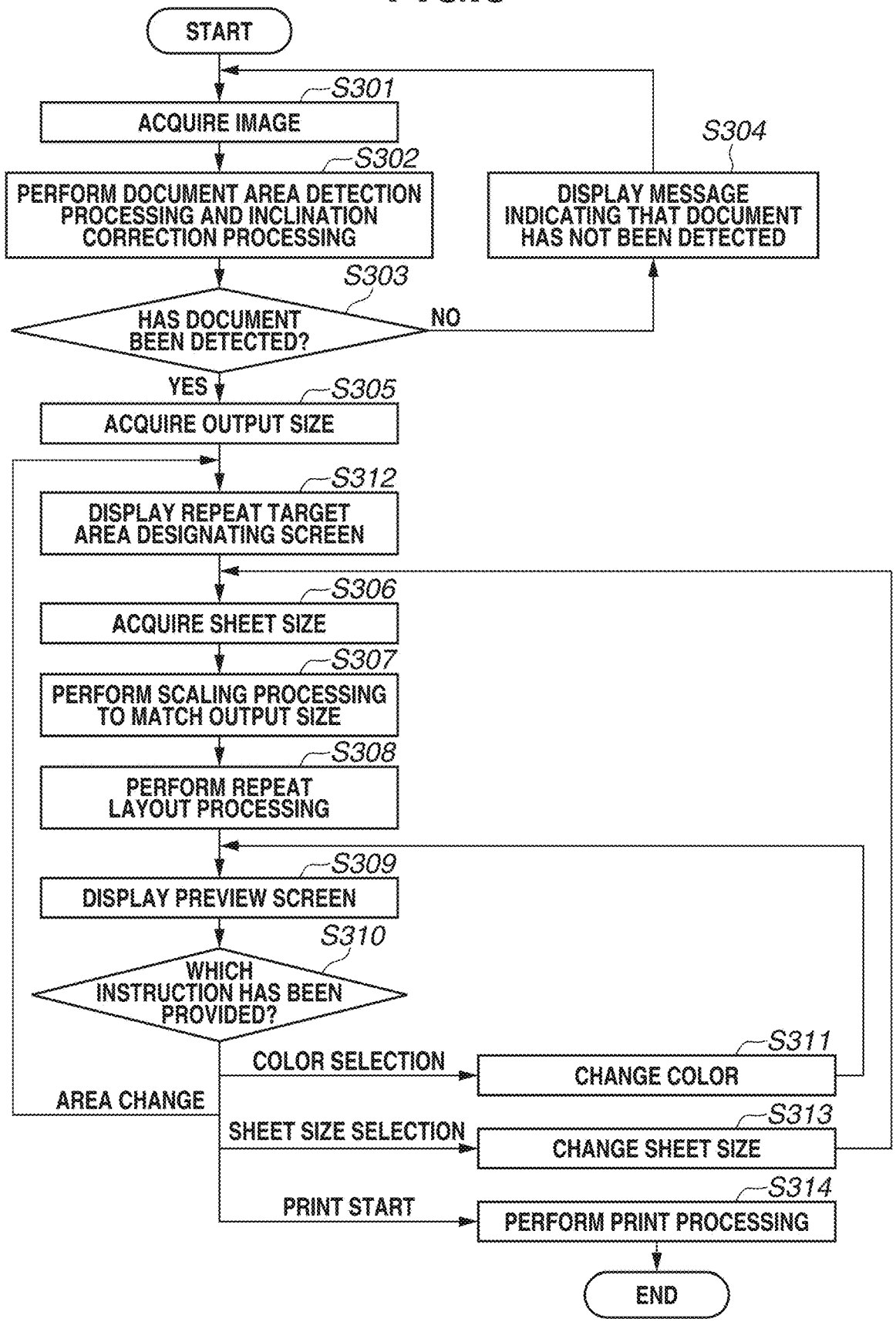
FIG. 8 is a flowchart illustrating image repeat processing according to a second embodiment.

FIG. 8 illustrates image repeat processing according to the second embodiment. A detailed description is given of a difference between the flowchart illustrated in FIG. 8 according to the second embodiment and the flowchart illustrated in FIG. 3 according to the first embodiment. In the second embodiment, if a CPU 111 determines that a document is present (YES in step S303 in FIG. 8), the processing proceeds to steps S305 and S312. In step S312, the CPU 111 displays the repeat target area designation screen illustrated in FIG. 9. After a repeat target area is determined on the repeat target area designation screen illustrated in FIG. 9 displayed in step S312, the CPU 111 executes the processing in S306 through S309 to display a preview screen.

Since each of the steps is similar to that of the first embodiment, description thereof is omitted.

According to the second embodiment, since the repeat target area designation screen illustrated in FIG. 9 is displayed before the preview screen illustrated in FIG. 7 is displayed, the user can check a repeat target area in advance. Moreover, the user can readily modify the repeat target area as necessary. As similar to the first embodiment, on the repeat target area designation screen illustrated in FIG. 9, the inclination-corrected document portion image acquired in step S302 is displayed instead of the scanned image of the entire platen glass acquired in step S301. Thus, the user can accurately and more readily designate an area that is intended to be set as a repeat target.

A third embodiment is hereinafter described. The first embodiment has been described using an example in which the preview screen illustrated in FIG. 7 is first displayed in a touch panel display area after a user presses a scanning start button on the operation screen illustrated in FIG. 6, whereas the second embodiment has been described using an example in which the repeat target area designation screen illustrated in FIG. 9 is first displayed in a touch panel display area after a user presses a scanning start button on the operation screen illustrated in FIG. 6. The third embodiment is described using an example in which a CPU 111 appropriately changes a screen to be first displayed either a preview screen illustrated in FIG. 7 or a repeat target area designation screen illustrated in FIG. 9 based on an a scanned document.

Figure 12:
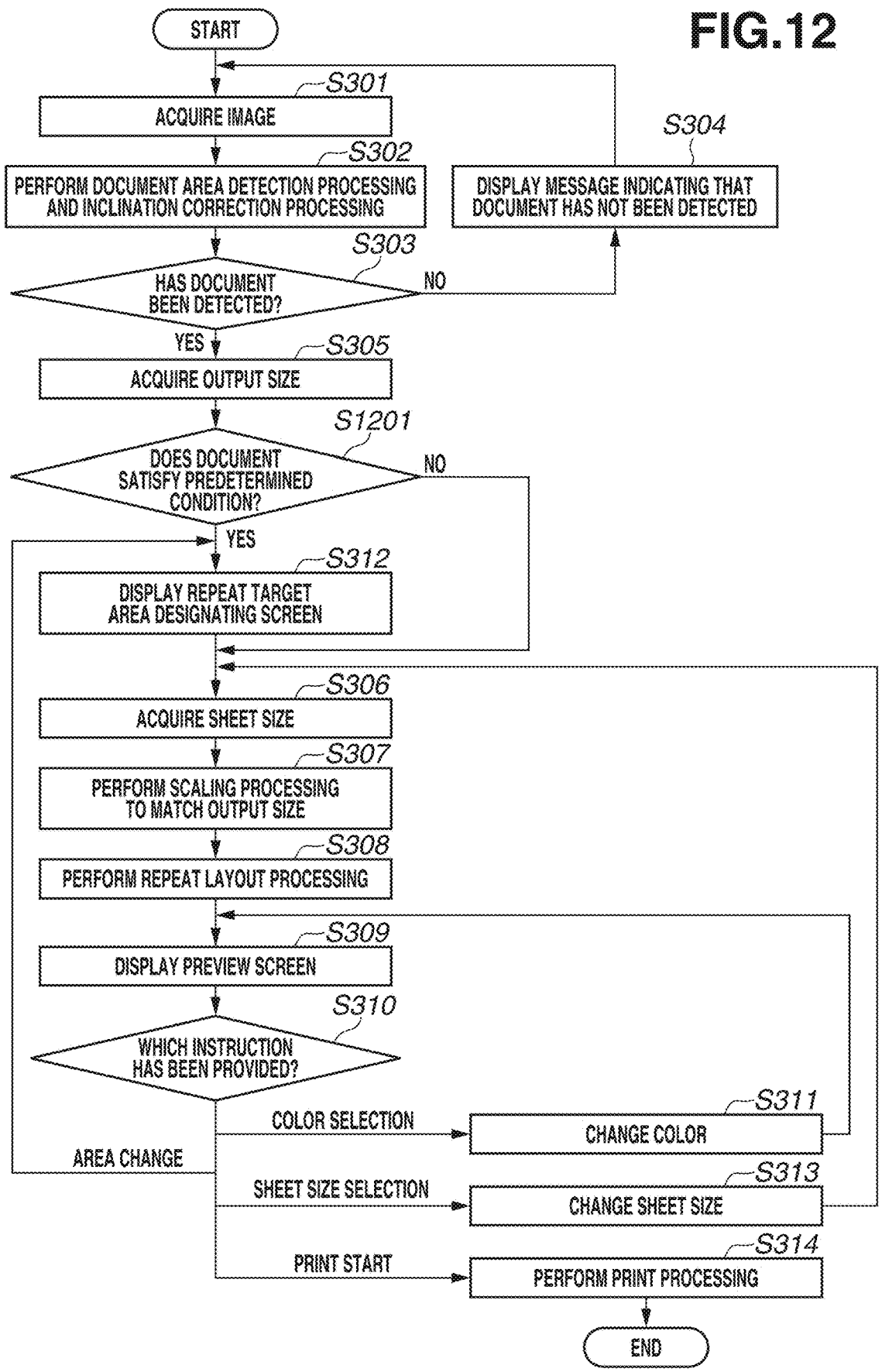
FIG. 12 is a flowchart illustrating image repeat processing according to a third embodiment.

Image repeat processing of the third embodiment is described in detail with reference to a flowchart illustrated in FIG. 12. In FIG. 12, if the CPU 111 determines that a document is present (YES in step S303), the processing proceeds to steps S305 and S1201. In step S1201, the CPU 111 determines whether a document image detected in step S302 satisfies a predetermined condition. If the CPU 111 determines that the document image satisfies the predetermined condition (YES in step S1201), the processing proceeds to step S312. In step S312, the CPU 111 displays a repeat target area designation screen illustrated in FIG. 9. On the other hand, if the CPU 111 determines that the document image does not satisfy the predetermined condition (NO in step S1201), the CPU 111 executes processing in steps S306 through S309 to display a preview screen illustrated in FIG. 7.

The predetermined condition to be used in the determination in step S1201 is, for example, whether a size of the document image detected in step S302 is greater than a predetermined size (e.g., A4 size). If the size of the document is greater than the predetermined size, it is conceivable that one portion of the document is more likely to be cut out and used as a repeat target. Thus, the processing proceeds to step S312 in which the repeat target area designation screen illustrated in FIG. 9 is displayed.

Another example of the predetermined condition to be used in the determination in step S1201 is described. For example, the CPU 111 executes area segmentation processing by which the document image detected in step S302 is segmented into areas on an attribute basis such as a text, a photograph, and a table, and then the CPU 111 determines that the predetermined condition is satisfied if a plurality of attribute areas is included in the document image. That is, if a plurality of attribute areas (e.g., a text area and a photograph area) is included inside a document, it is highly conceivable that either of such areas is more likely to be used as a repeat target. Thus, the processing proceeds to step S312 in which the repeat target area designation screen illustrated in FIG. 9 is displayed.

Since each of steps S301 through S314 of the flowchart illustrated in FIG. 12 is similar to each of respective steps in the first and second embodiments, description thereof is omitted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-095656, filed May 17, 2018, which is hereby incorporated by reference herein in its entirety.

What is claimed is:

1. An image processing apparatus comprising:
a memory to store a program; and
at least one processor to execute the program to perform operations including:
acquiring an inclination-corrected document image by executing detection of a document area from a scanned image, extraction of a document image corresponding to the detected document area from the scanned image, and correction of an inclination of the extracted document image,
designating a print output size of an image of a repeat target area based on an instruction from a user,
displaying the acquired inclination-corrected document image with a frame that indicates a repeat target area on the acquired inclination-corrected document image, wherein an aspect ratio of the displayed frame is the same as an aspect ratio of the designated print output size, and wherein a position and/or a size of the displayed frame is variable based on the instruction from the user,
setting a set repeat target area based on the frame displayed with the inclination-corrected document image,
scaling up/down an image inside the set repeat target area such that the image inside the set repeat target area is printed in the print output size, and repeatedly laying out the scaled up/down image within a designated sheet size to create an output image, and
executing print processing by using the created output image.

2. The image processing apparatus according to claim 1, wherein the at least one processor is to execute the program to further perform operations including controlling such that the aspect ratio of the displayed frame is the same as the aspect ratio of the designated print output size when the position and/or the size of the displayed frame is changed based on the instruction from the user.

3. The image processing apparatus according to claim 1, wherein the at least one processor is to execute the program to further perform operations including displaying at least one button in which an output size is registered beforehand, and
wherein, if one of the displayed buttons is selected by the user for designation of the output size, the output size registered in the selected button is used as the designated print output size.

4. A non-transitory computer-readable storage medium storing a program to cause an image processing apparatus to perform a method, the method comprising:
acquiring an inclination-corrected document image by executing detection of a document area from a scanned image, extraction of a document image corresponding to the detected document area from the scanned image, and correction of an inclination of the extracted document image;
designating a print output size of an image of a repeat target area based on an instruction from a user;
displaying the acquired inclination-corrected document image with a frame that indicates a repeat target area on the acquired inclination-corrected document image, wherein an aspect ratio of the displayed frame is the same as an aspect ratio of the designated print output size, and wherein a position and/or a size of the displayed frame is variable based on the instruction from the user;
setting a set repeat target area based on the frame displayed with the inclination-corrected document image;
scaling up/down an image inside the set repeat target area such that the image inside the set repeat target area is printed in the print output size, and repeatedly laying out the scaled up/down image within a designated sheet size to create an output image; and executing print processing by using the created output image.

5. The non-transitory computer readable storage medium according to claim 4, the method further comprising controlling such that the aspect ratio of the displayed frame is the same as the aspect ratio of the designated print output size when the position and/or the size of the displayed frame is changed based on the instruction from the user.

6. The non-transitory computer readable storage medium according to claim 4, the method further comprising displaying at least one button in which an output size is registered beforehand, wherein, if one of the displayed buttons is selected by the user for designation of the output size, the output size registered in the selected button is used as the designated print output size.

7. A method for an image processing apparatus, the method comprising:

acquiring an inclination-corrected document image by executing detection of a document area from a scanned image, extraction of a document image corresponding to the detected document area from the scanned image, and correction of an inclination of the extracted document image;

designating a print output size of an image of a repeat target area based on an instruction from a user;

displaying the acquired inclination-corrected document image with a frame that indicates a repeat target area on the acquired inclination-corrected document image, wherein an aspect ratio of the displayed frame is the same as an aspect ratio of the designated print output size, and wherein a position and/or a size of the displayed frame is variable based on the instruction from the user;

setting a set repeat target area based on the frame displayed with the inclination-corrected document image;

scaling up/down an image inside the set repeat target area such that the image inside the set repeat target area is printed in the print output size, and repeatedly laying out the scaled up/down image within a designated sheet size to create an output image; and executing print processing by using the created output image.

* * * * *